United States Patent
Lele

(10) Patent No.: US 7,181,524 B1
(45) Date of Patent: Feb. 20, 2007

(54) METHOD AND APPARATUS FOR BALANCING A LOAD AMONG A PLURALITY OF SERVERS IN A COMPUTER SYSTEM

(75) Inventor: Abhijeet A. Lele, Pune (IN)

(73) Assignee: Veritas Operating Corporation, Mountain View, CA (US)

( * ) Notice: Subject to any disclaimer, the term of this patent is extended or adjusted under 35 U.S.C. 154(b) by 642 days.

(21) Appl. No.: 10/461,192

(22) Filed: Jun. 13, 2003

(51) Int. Cl.
*G06F 15/16* (2006.01)

(52) U.S. Cl. .................. 709/226; 709/224; 718/105

(58) Field of Classification Search ........ 709/200–203, 709/217–229, 238–242; 718/105
See application file for complete search history.

(56) References Cited

U.S. PATENT DOCUMENTS

| | | | |
|---|---|---|---|
| 5,951,694 A * | 9/1999 | Choquier et al. ............. | 714/15 |
| 6,223,205 B1 * | 4/2001 | Harchol-Balter et al. ... | 718/105 |
| 6,314,463 B1 * | 11/2001 | Abbott et al. ............... | 709/224 |
| 6,571,288 B1 * | 5/2003 | Sarukkai ..................... | 709/226 |
| 6,601,084 B1 * | 7/2003 | Bhaskaran et al. ......... | 718/105 |
| 6,728,748 B1 * | 4/2004 | Mangipudi et al. ......... | 718/105 |
| 6,862,623 B1 * | 3/2005 | Odhner et al. .............. | 709/226 |
| 6,871,347 B2 * | 3/2005 | Hay ............................ | 718/105 |
| 6,879,995 B1 * | 4/2005 | Chinta et al. ............... | 709/204 |
| 6,880,156 B1 * | 4/2005 | Landherr et al. ........... | 718/105 |
| 2001/0034853 A1 * | 10/2001 | Takatama et al. ............. | 714/4 |
| 2002/0032777 A1 * | 3/2002 | Kawata et al. .............. | 709/226 |
| 2002/0116351 A1 * | 8/2002 | Skaanning et al. ........... | 706/21 |
| 2002/0133532 A1 * | 9/2002 | Hossain ....................... | 709/105 |
| 2002/0152322 A1 * | 10/2002 | Hay ........................... | 709/245 |
| 2003/0014650 A1 * | 1/2003 | Freed et al. ................. | 713/189 |
| 2003/0187982 A1 * | 10/2003 | Petit ........................... | 709/225 |
| 2004/0103194 A1 * | 5/2004 | Islam et al. ................. | 709/225 |
| 2005/0108380 A1 * | 5/2005 | Odhner et al. ............. | 709/223 |
| 2005/0144280 A1 * | 6/2005 | Kawai et al. ............... | 709/225 |
| 2005/0198335 A1 * | 9/2005 | Brown et al. ............... | 709/229 |

* cited by examiner

Primary Examiner—Moustafa M. Meky
(74) Attorney, Agent, or Firm—Moser IP Law Group

(57) ABSTRACT

Embodiments of the invention are directed to a method and apparatus of balancing a load among a plurality of servers in a computer system. The method includes determining an estimated load value for an action as the action is being initiated, forwarding the estimated load value to a load balancer, and using the estimated load value to balance the load.

22 Claims, 2 Drawing Sheets

METHOD AND APPARATUS FOR BALANCING A LOAD AMONG A PLURALITY OF SERVERS IN A COMPUTER SYSTEM

BACKGROUND OF THE INVENTION

1. Field of the Invention

Embodiments of the present invention generally relate to data storage systems, and more particularly, to balancing a load among a plurality of servers in a computer system.

2. Description of the Related Art

Modern computer networks generally comprise a plurality of user computers connected to one another and to a computer server via a communications network. To provide redundancy and high availability of information and applications that are executed upon a computer server, multiple computer servers may be arranged in a cluster, i.e., forming a server cluster. Such server clusters are available under the trademark VERITAS CLUSTER SERVER from Veritas Software Corporation of Mountain View, Calif. In such server clusters, a plurality of servers communicate with one another to facilitate failover redundancy such that when software or hardware (i.e., computer resources) become inoperative on one server, another server can quickly execute the same software that was running on the inoperative server substantially without interruption. As such, a user of server services that are supported on a server cluster would not be substantially impacted by the inoperative server or software.

The increasing need for high availability for applications and servers in today's data centers inevitably leads to an increased volume of network traffic, which in turn leads to growing performance demands on applications and servers. To address growing performance demands on applications and servers, system administrators currently use traffic management software to scale the number of servers able to process user requests and balance the network traffic between those servers. In this manner, administrators may ensure that system performance keeps up with performance demands from users. Current traffic management technology, however, balances the network traffic only after the load imposed by client requests has been born by the servers. In this manner, the load is balanced only after the actions associated with the load have been executed, which often results in delayed load balancing.

Accordingly, a need exists for a method and system for balancing the load among a group of servers in a more timely manner.

SUMMARY OF THE INVENTION

Embodiments of the present invention are generally directed to a method of balancing a load among a group of servers in a computer system. When storage management software, such as cluster control software, a volume manager, file system software, initiates an action, the storage management software determines an estimated load value associated with the action. The estimated load value may be a user input value or a value that is based on a previously executed substantially similar action. Alternatively, the storage management software may calculate the estimated value using a heuristic algorithm. Once the estimated load value is determined, the storage management software forwards the estimated load value to a load balancer, which then uses the estimated value to balance the load among the group of servers.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF THE INVENTION

Figure 1:
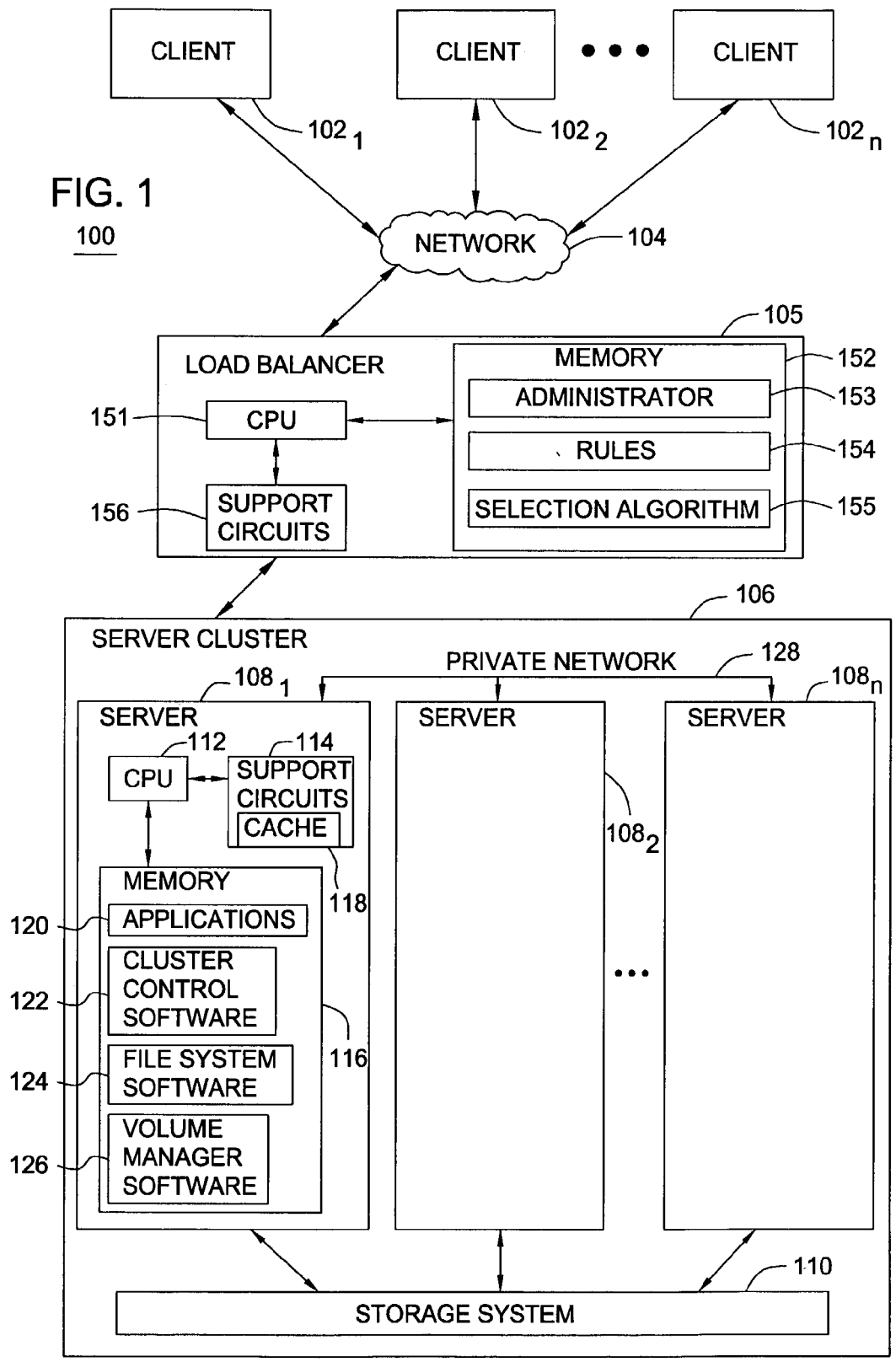
FIG. 1 illustrates a computer network in which one embodiment of the present invention may be utilized.

FIG. 1 depicts a computer network 100 in which one embodiment of the present invention may be utilized. The computer network 100 comprises a plurality of client computers $102_1$, $102_2$, . . . $102_n$ that are connected to a load balancer or a traffic manager 105 through a computer network 104. The load balancer 105 may be connected to a server cluster 106 through a hub or a switch. The client computers 102 may contain one or more individual computers, wireless devices, personal digital assistants, desktop computers, laptop computers or any other digital device that may benefit from connection to a computer network.

The computer network 104 is a conventional computer network, which may be an Ethernet network or a fiber channel network. The client computers 102 may be connected to the load balancer 105 through a firewall or a router. Although the load balancer 105 is illustrated as being separate from the server cluster 106, the load balancer 105 may also be a piece of software running on a server within the server cluster 106.

The load balancer 105 is configured to distribute requests from client computers 102 among the servers in the cluster 106 so that the load imposed by client requests is shared. The load balancer 105 distributes the requests according to certain rules 154, which may also be referred to as policies or filters. The type of rule applied is generally defined by an administrator 153 based on the transport/application protocol and/or the contents of the packet. For example, one rule may be based on the Internet protocol (IP) packet destination. That is, the load balancer 105 compares the incoming packet's destination IP address against a list of virtual IP addresses maintained in the load balancer configuration. If a match is found, the client request is handled by a group of servers (server group) designated to serve that port. Based on a prespecified server selection algorithm 155, a server from the group is selected to handle the client request. Another rule is based on the Transmission Control Protocol/User Datagram Protocol (TCP/UDP) destination port. That is, the load balancer 105 allows traffic to be directed based on the destination TCP/UDP port (e.g., Web servers running on port 80, telnet running on port 23, etc.). Yet another rule is based on protocol content. That is, the load balancer 105 distributes the network traffic based on the type of content. For example, music MP3 files, graphic GIF and JPEG files, and text-based HTML files may be grouped on separate servers with traffic directed between the server groups, which are generally defined as logical groupings of servers.

The load balancer 105 may use various methods to balance the load among various servers in the group. Such methods include "round robin," "weighted round robin," "least connections," or "weighted least connections."

According to the "round robin" algorithm, the load balancer 105 sequentially selects servers in a group to evenly distribute the load across all servers in the group. According to the "weighted round robin" algorithm, each server in the group is assigned a value that indicates its processing capacity. Servers with the greatest processing capacity are given more traffic than servers with lesser processing capacity. According to the "least connections" algorithm, the load balancer 105 directs traffic to the server with the least number of active connections. According to the "weighted least connections" algorithm, each server in the group is assigned a value that indicates its processing capacity. Servers with the greatest processing capacity and the least number of active connections are given more traffic than other servers.

In accordance with one embodiment of the invention, storage management software, such as cluster control software 122, file system software 124, volume manager software 126, determines an estimated load value associated with an action as the action is being initiated by the storage management software. The storage management software forwards the estimated load value to the load balancer 105, which then uses the estimated load value to balance the load among the plurality of servers in the cluster 106.

The server cluster 106 will now be described in more detail in the following paragraphs. The server cluster 106 generally consists of multiple servers $108_1$, $108_2$, ... $108_n$ that are connected in various combinations to shared storage devices depicted as storage system 110. Servers $108_1$, $108_2$, ... $108_n$ may be referred to as nodes of the server cluster 106. Although one server cluster is depicted in FIG. 1, those skilled in the art will realize that many server clusters benefiting from the invention can be connected to the computer network 104. Such a server cluster 106 may be a VERITAS CLUSTER SERVER available from Veritas Software Corporation of Mountain View, Calif. Each server 108 generally includes at least one central processing unit (CPU) 112, support circuits 114, and memory 116. The CPU 112 may include one or more conventionally available microprocessors. The support circuits 114 are well known circuits that include cache, power supplies, clocks, input/output interface circuitry and the like.

The memory 116 may include random access memory, read only memory, removable disk memory, flash memory, and various combinations of these types of memory. The memory 116 is sometimes referred to as main memory and may in part be used as cache memory 118. The memory 116 may store various software applications, such as cluster control software 122, file system software 124, volume manager software 126 and various applications 120. A private network 128 interconnects each of the servers $108_1$, $108_2$, ... $108_n$ that are members of the server cluster 106. Two independent networks between all clustered servers may be used to provide both path redundancy and to discriminate between a network failure and a server failure.

Various applications 120 may be a database application, a web server application and the like. Various applications 120 may be executed on each server 108 or only on specific servers 108. If during operation, one of the applications fails, hardware supporting the application fails, or an entire server fails, another server within the server cluster 106 is configured to execute the application from the point at which the failure occurred. As such, the client computers 102 will not experience any interruption or will experience minimal interruption of the services provided by the server cluster 106. To facilitate this high availability of computer services, the server cluster control software 122 is configured to monitor and control applications running in the cluster 106 and restart applications 120 in response to a variety of hardware or software faults.

The servers 108 in the server cluster 106 may be defined with the same cluster identification and connected to one another via a set of redundant heartbeat networks, e.g., one or more public or private networks 128. The servers 108 may also be configured to be constantly aware of the status of all resources on all other nodes 108.

The storage system 110 is configured to provide access to shared application data for those servers 108 hosting the application. In that respect, the actual storage system connectivity determines where applications can be executed. The servers 108 sharing access to storage within the storage system 110 generally may execute a common application and failover such applications. Servers 108 without common storage, on the other hand, generally cannot failover an application that stores data to disk.

The cluster control software 122 will now be described in more detail in the following paragraphs. In accordance with one embodiment of the invention, the cluster control software 122 is configured to estimate a load value associated with an action that the cluster control software 122 initiates. The estimated load value is forwarded to the load balancer 105, which then uses the estimated load value to balance the load among the various servers 108 within the cluster 106.

Various operations of the cluster control software 122 in connection with embodiments of the invention will now be generally described in the following paragraphs. Within the server cluster 106, resources are defined as hardware or software entities, such as disks, network interface cards, IP addresses, applications and databases, which are controlled by the cluster control software 122. Controlling a resource means bringing the resource online (onlining or starting), taking the resource offline (offlining or stopping), and monitoring the health and status of the resource. Resources are classified according to types, and multiple resources can be of a single type. For example, two disk resources are both classified as type "disk". How the cluster control software 122 starts and stops a resource is specific to the resource type. For example, mounting starts a file system resource, while configuring an IP address on a network interface card starts an IP resource. Monitoring a resource means testing the resource to determine if the resource is online or offline. How the cluster control software 122 monitors a resource is specific to the resource type. For example, a file system resource tests as "online" if mounted, and an IP address tests as "online" if configured. Each resource is identified by a name that is unique among all resources in the cluster. The cluster control software 122 includes a set of predefined resource types. For each resource type, the cluster control software 122 has a corresponding agent. The agent provides the resource type specific logic to control the resources.

The actions required to bring a resource online or take it offline differ significantly for different types of resources. Bringing a disk group online, for example, requires importing the disk group. Bringing a database online requires starting a database manager process and issuing the appropriate startup command or commands to the database manager. From the cluster control software 122 point of view, the same result is achieved, i.e., making the resource available. However, the actions performed to achieve the result are quite different. The cluster control software 122 handles this function disparity between different types of resources using agents that correspond to each resource.

Each type of resource supported in a cluster is associated with an agent. An agent is an installed program designed to control a particular resource type. For example, for the cluster control software 122 to bring a database resource online, it does not need to understand the database language; it simply passes the "online" command to the database agent. The database agent knows to call a database server application and issue the appropriate startup command.

In this manner, the cluster control software 122 performs administrative operations on resources, including starting, stopping, restarting and monitoring at the service group level. A service group (also known as resource group) is a set of resources working together to provide application services to clients. For example, a Web application service group might consist of:

Disk groups on which the web pages to be served are stored
A volume built in the disk group
A file system using the volume
A database whose table spaces are files and whose rows contain page pointers
The network interface card or cards used to plumb the virtual IP address
One or more IP addresses associated with the network card or cards
The application program and associated code libraries Service group operations initiate administrative operations for all resources within the group. For example, when a service group is brought online, all resources within the group are brought online. When a failover occurs in the server cluster 106, resources never failover individually, i.e., the entire service group of which the resource is a member is failed over as a unit. If there is more than one group defined on a server 108, one group may failover without affecting the other group or groups on the server 108. From a cluster standpoint, there are two significant aspects of a service group as a collection of resources. First, if the service group is to run on a particular server, all the resources required by the group must be available to the server. Second, the resources comprising a service group have interdependencies; that is, some resources (e.g., NIC) must be operational before other resources (e.g., IP address) can be made operational.

In general, resource dependencies determine the specific order in which resources within a service group are brought online or offline when the service group is brought offline or online. For example, a disk group, as defined by the volume manager 126, must be imported before volumes in the disk groups can be started, and volumes must be started before file systems can be mounted. In the same manner, file systems must be unmounted before volumes are stopped, and volumes must be stopped before the disk groups are deported.

The volume manager 126 will now be described in more detail in the following paragraphs. In accordance with one embodiment of the invention, the volume manager 126 is configured to estimate a load value associated with an action that the volume manager 126 initiates. The estimated load value is forwarded to the load balancer 105, which then uses the estimated load value to balance the load among the various servers 108 within the cluster 106.

Various operations of the volume manager 126 in connection with embodiments of the invention will now be generally described in the following paragraphs. The volume manager 126 is generally defined as a storage management subsystem that allows the user to manage physical disks as logical devices called volumes. A physical disk device is the basic storage device where data is ultimately stored, and a volume is a virtual disk device that appears to applications, databases, and file systems like a physical disk device. Each volume records and retrieves data from one or more physical disks. Due to its nature, a volume is not restricted to a particular disk or a specific area of a disk. Thus, volumes can be accessed by file systems, databases, or other applications in the same way that physical disks are accessed. The volumes created by the volume manager 126 look and act to the operating system like physical disks. Each volume is typically stored in a disk group, which is a collection of volumes that share a common configuration. In this manner, volumes are created within a disk group. A file system can be placed on the volume to organize the disk space with files and directories.

The volume manager 126 overcomes physical restrictions imposed by hardware disk devices by providing a logical volume management layer. This allows volumes to span multiple disks. The volume manager 126 typically operates as a subsystem between the operating system and the storage management system, such as a SAN-based, direct attached storage and other configurations of network attached storage, which includes storage components, including storage arrays, just a bunch of disks (JBODs) direct attached storage and the respective lower level components, such as disks, logical unit numbers (LUNs) and other addressable unit elements. When one or more physical disks are brought under the control of the volume manager 126, the volume manager 126 creates virtual objects called volumes on those physical disks.

If a disk fails or otherwise becomes unavailable, access to the data on that disk is interrupted. To minimize downtime, it is desirable to offer redundancy so that access to the data can continue in the face of disk failure. Redundancy may be accomplished through mirroring, i.e., the maintenance of full additional copies of the data on separate disks.

While mirroring allows users to continue to access data in the face of media failure, the continued access will be subject to performance degradation. In addition, the data will be vulnerable to another failure. Hot relocation is one technique for providing minimal vulnerability to subsequent failure and degradation while deferring disk replacement. Hot relocation allows a system to react automatically to I/O failures on redundant volume manager objects and restores redundancy and access to those objects. The volume manager 126 detects I/O failures on disks and relocates the affected subdisks. The subdisks are relocated to disks designated as spare disks and/or free space within the disk group. The volume manager 126 then reconstructs the objects that existed before the failure and makes them accessible again.

The file system software 124 will now be described in more detail in the following paragraphs. In accordance with one embodiment of the invention, the file system software 124 is configured to estimate a load value associated with an action that the file system software 124 initiates. The estimated load value is forwarded to the load balancer 105, which then uses the estimated load value to balance the load among the various servers 108 within the cluster 106.

Various operations of the file system software 124 in connection with embodiments of the invention will now be generally described in the following paragraph. As files are created, removed, extended and truncated in a file system, the storage used for each file may become fragmented, which inhibits effective file I/O. As such, the file system software 124 is configured to provide an online defragmentation utility that may be run safely on live file systems without interfering with user access. Furthermore, the file system software 124 is configured to bring the fragmented extents of files closer together, group them by type and frequency of access, and compact and sort directories.

Figure 2:
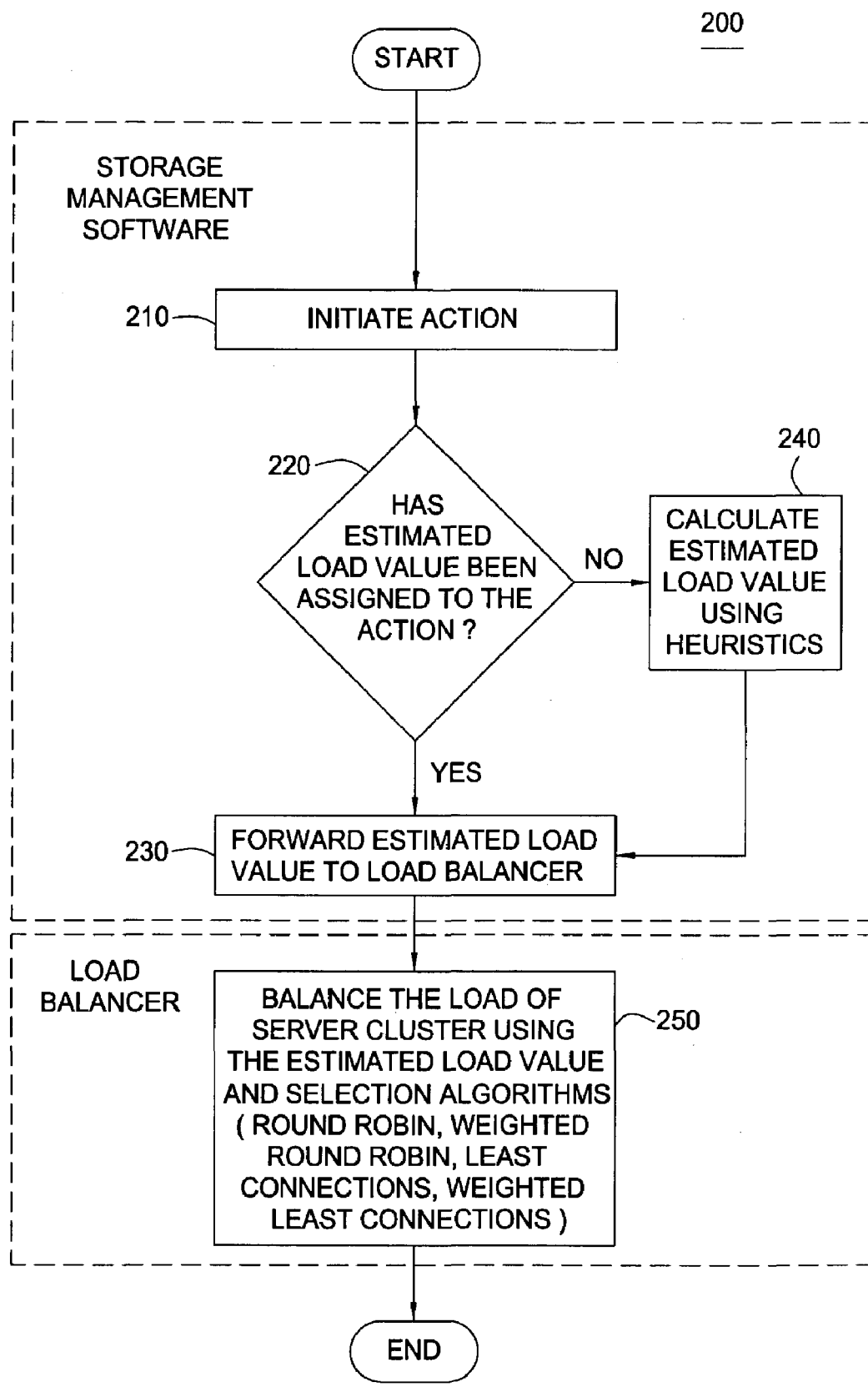
FIG. 2 illustrates a flow diagram of a method for balancing a load in a server cluster in accordance with one embodiment of the invention.

FIG. 2 illustrates a flow diagram of a method 200 for balancing a load among servers 108 in the server cluster 106 in accordance with one embodiment of the invention. At step 210, an action is initiated by storage management software, such as the cluster control software 122, the volume manager software 126, the file system software 124 and any other software applications that are directed to storage management. In one embodiment, the action may be in response to a user or client request, such as a request to online or offline a service group, or online defragmentation. In this case, the action is onlining or offlining the service group, or online defragmentation, and the storage management software that would execute the action is the cluster control software 122 or the file system software 124, respectively. In another embodiment, the action may be in response to a system event, such as a hardware failure or an input output (I/O) failure. In this case, the action may be hot relocation and the storage management software may be the volume manager 126. In yet another embodiment, the action may be initiated by the storage management software in response to events occurring in the cluster, such as a power failure in one of the servers. In such a case, the service group may failover, thereby constituting an action executable by the cluster control software 122.

While the action is being initiated by the storage management software, the storage management software determines as to whether an estimated load value has been assigned to the action (at step 220). The estimated load value may be a value based on a previously executed substantially similar action or a value that has been manually assigned by the user. The estimated value may be stored in the storage system 110 or memory 116. The estimated load value may indicate the amount (e.g., megabytes) or the percentage of total system resources, which may include CPU, memory and I/O usage. The estimated load value may also indicate the particular node that is executing the action. The estimated load value may be based on the type of system or action. If the storage management software is successful in locating the estimated load value, then the storage management software forwards the estimated load value to the load balancer 105 (at step 230). If the storage management software is not successful in locating the estimated load value, then the storage management software calculates an estimated load value based on heuristics or a heuristic algorithm (at step 240). Heuristics is generally defined as general strategies or rules of thumb that help provide direction in solving problems. Heuristics typically employ techniques that utilize self-education, e.g., feedback, to improve performance.

Upon receipt of the estimated load value from the storage management software, the load balancer 105 uses the estimated load value to balance the load among the servers 108 in the server cluster 106 (at step 250). In balancing the load among the servers 108, the load balancer 106 may also take into account other load values (i.e., measured system load) from other software packages, such as a database application, a web server application and the like. The load balancer 106 may be configured to balance a number of estimated loads from a number of storage management software packages. The load balancer 106 may balance the load using the load balancing methods (i.e., server selection algorithms, e.g., round robin, weighted round robin, least connections, weighted least connections) that were described in previous paragraphs.

While the foregoing is directed to embodiments of the present invention, other and further embodiments of the invention may be devised without departing from the basic scope thereof, and the scope thereof is determined by the claims that follow.

What is claimed is:

1. A method of balancing a load among a plurality of servers, comprising:
    initiating an action involving a service group becoming unavailable while executing on at least one server in the plurality of servers;
    determining an estimated load value for the action as the action is being initiated, wherein the estimated load value is indicative of loading upon the plurality of servers to initiate the service group;
    forwarding the estimated load value to a load balancer; and
    using the estimated load value to balance the load amongst the plurality of servers.

2. The method of claim 1, wherein the action is initiated by one of a cluster control software, a volume manager and a file system software.

3. The method of claim 1, wherein the estimated value was previously assigned by a user.

4. The method of claim 1, wherein the estimated value is based on a previously executed substantially similar action.

5. The method of claim 1, wherein the determining step comprises calculating the estimated value using a heuristic algorithm.

6. The method of claim 1, wherein the determining step and the forwarding step are performed by a storage management software.

7. The method of claim 6, wherein the storage management software is one of a cluster control software, a volume manager and a file system software.

8. The method of claim 1, wherein the using step is performed by a load balancer.

9. The method of claim 1 wherein the action comprises at least one of a failover process, a service group onlining process, a defragmentation process, and a hardware failure recovery process.

10. An apparatus for balancing a load among a plurality of servers, comprising:
    means for initiating an action involving a service group becoming unavailable while executing on at least one server in the plurality of servers;
    means for determining an estimated load value for the action as the action is being initiated, wherein the estimated load value is indicative of loading upon the plurality of servers to initiate the service group;
    means for forwarding the estimated load value to a load balancer; and
    means for using the estimated load value to balance the load amongst the plurality of servers.

11. The apparatus of claim 10, wherein the action is initiated by one of a cluster control software, volume manager and file system software.

12. The apparatus of claim 10, wherein the estimated value was previously assigned by a user.

13. The apparatus of claim 10, wherein the estimated value is based on a previously executed substantially similar action.

14. The apparatus of claim 10, wherein the means for determining comprises means for calculating the estimated value using a heuristic algorithm.

15. A system, comprising:
   a processor; and
   a memory comprising program instructions, wherein the program instructions are executable by the processor to:
      initiate an action involving a service group becoming unavailable;
      determine an estimated load value for the action while the action is being initiated, wherein the estimated load value is indicative of loading upon the processor to initiate the service group; and
      forward the estimated load value to a load balancer.

16. The system of claim 15, wherein the action is initiated by one of a cluster control software, a volume manager and a file system software.

17. The system of claim 15, wherein the estimated value is one of previously assigned by a user and based on a previously executed substantially similar action.

18. The system of claim 15, wherein the program instructions are further executable by the processor to calculate the estimated value using a heuristic algorithm.

19. A computer network, comprising:
   a load balancer; and
   a plurality of servers connected to the load balancer, wherein at least one of the servers comprises:
      a memory containing a storage management software; and
      a processor which, when executing the storage management software, performs an operation comprising:
         initiating an action involving a service group becoming unavailable;
         determining an estimated load value for the action as the action is being initiated, wherein the estimated load value is indicative of loading upon the processor to initiate the service group; and
         forwarding the estimated load value to the load balancer.

20. The computer network of claim 19, wherein the estimated value is one of previously assigned by a user and based on a previously executed substantially similar action.

21. The computer network of claim 19, wherein determining the estimated load value comprises calculating the estimated value using a heuristic algorithm.

22. The computer network of claim 19, wherein the load balancer uses the estimated load value to balance a load among the plurality of servers.

* * * * *